United States Patent [19]

Zinnes et al.

[11] 3,905,997

[45] Sept. 16, 1975

[54] 3-ARYL-5-OXO-2-PYRAZOLINE-4-CARBOXANILIDES AND PROCESS THEREFOR

[75] Inventors: Harold Zinnes, Rockaway; Neil A. Lindo, Chatham, both of N.J.

[73] Assignee: Warner-Lambert Company, Morris Plains, N.J.

[22] Filed: June 21, 1974

[21] Appl. No.: 481,925

[52] U.S. Cl. ............................ 260/310 A; 424/273
[51] Int. Cl.² ...................................... C07D 231/08
[58] Field of Search ............................... 260/310 A

[56] References Cited
OTHER PUBLICATIONS

Papini et al., Chemical Abstracts 54: 12122–12123, (1960).

*Primary Examiner*—Albert T. Meyers
*Assistant Examiner*—Norman A. Drezin
*Attorney, Agent, or Firm*—Albert H. Graddis; Frank S. Chow

[57] ABSTRACT

Compounds of the formula;

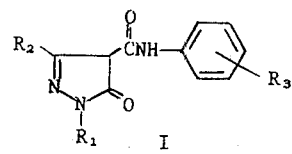

wherein $R_1$ is alkyl or aryl; $R_2$ is aryl; and $R_3$ is alkyl, alkoxy, halogen, trifluoromethyl, carboalkoxyl, cyano, and the like. These compounds are indicated in the management of inflammatory conditions such as rheumatoid arthritis.

4 Claims, No Drawings

3-ARYL-5-OXO-2-PYRAZOLINE-4-CARBOXANILIDES AND PROCESS THEREFOR

The present invention relates to 3-aryl-5-oxo-2-pyrazoline-4-carboxanilides having the structural formulas:

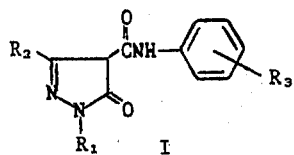

wherein $R_1$ is alkyl or aryl; $R_2$ is aryl; and $R_3$ is alkyl, alkoxyl, halogen, trifluoromethyl, carboalkoxyl, cyano, and the like, and their alkali metal salts.

In the above definitions for $R_1$, $R_2$, and $R_3$, the terms "alkyl" and the alkyl portion of "alkoxy" denote an aliphatic hydrocarbon having 1 to 7 carbon atoms in the carbon chain. It includes straight chain as well as branched chain radicals, for example, methyl, propyl, isopropyl and the like. The term "aryl" denotes a monocyclic aromatic hydrocarbon preferably of 6 to 10 carbon atoms such as, for example, phenyl, tolyl and the like.

According to the present invention, the compounds I are prepared by converting a compound of structure II to its anion by treatment with a base such as sodium hydride in a solvent such as tetrahydrofuran or dimethylformamide. Said anion is then reacted with an appropriately substituted aryl isocyanate to give the subject compound I. This reaction may be represented by the following scheme:

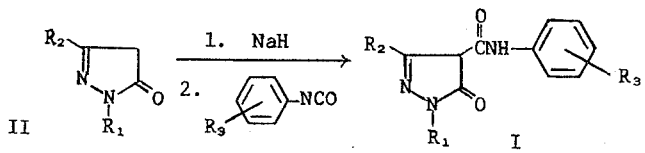

The starting material II is prepared as described by Knorr, Ann. 238, 147 (1887); Ber. 28, 2546 (1887).

The compounds of structure I are useful as antiinflammatory agents. When administered orally to animals such as rats at a dose of 25–100 mg/kg they are able to cause reduction in swelling of the paw induced by an irritant such as carrageenin.

These compounds and their alkali metal salts are indicated in the management of inflammatory conditions such as rheumatoid arthritis within the above dose range 2 or 3 times daily. They are administered as aqueous suspensions or as aqueous solutions of their alkali metal salts.

In order to illustrate further the practice of this invention, the following examples are included.

EXAMPLE 1

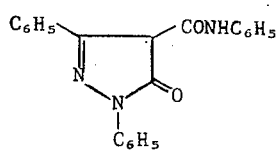

5-Oxo-1,3-diphenyl-2-pyrazoline-4-carboxanilide

To a stirred slurry of 0.033 mol of sodium hydride in 25 ml of tetrahydrofuran was added, dropwise with cooling, a solution of 7.1 g (0.03 mol) of 5-oxo-1,3-diphenyl-2-pyrazoline in 150 ml of tetrahydrofuran. After gas evolution had ceased, 5.3 g (0.045 mol) of phenylisocyanate was added. The mixture was stirred for 30 minutes, concentrated on a steam bath to about one fourth its volume, and poured into ice water. The aqueous solution was washed with ether and then acidified. The resulting precipitate was collected and recrystallized from ethyl acetate to give 10.1 g of product; mp 158°–161° dec. $\nu_{max}^{Nujol}$ 1660, 1595 cm$^{-1}$.

Anal. Calcd for $C_{22}H_{17}N_3O_2$: C, 74.35; H, 4.82; N, 11.84. Found: C, 74.16; H, 4.85; N, 11.92.

EXAMPLE 2

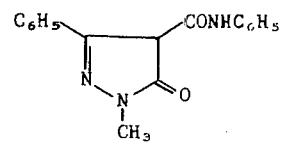

1-Methyl-5-oxo-3-phenyl-2-pyrazoline-4-carboxanilide

To a slurry of 0.055 mol of sodium hydride in 25 ml of dimethylformamide, was added dropwise with cooling a solution of 8.7 g (0.05 mol) of 1-methyl-5-oxo-3-phenyl-2-pyrazoline in 160 ml of dimethylformamide. After gas evolution had ceased, 6.6 g (0.055 mol) of phenylisocyanate was added. The mixture was stirred at room temperature for 1.5 hr. and poured into ice water. The aqueous solution was washed with ether and then acidified. The resulting precipitate was collected and recrystallized from chloroform-methanol to give 11 g of product; mp 188°–193° dec (sinters at 170°). $\nu_{max}^{Nujol}$ 1670 cm$^{-1}$ Anal. Calcd for $C_{17}H_{15}N_3O_2$: C, 69.61; H, 5.15; N, 14.33. Found: C, 69.59; H, 5.17; N, 14.57.

We claim:

1. A compound of the formula:

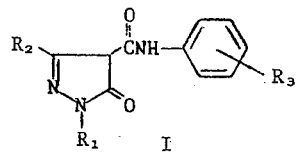

wherein $R_1$ is alkyl of 1 to 7 carbon atoms, or phenyl; $R_2$ is phenyl; $R_3$ is hydrogen, or the corresponding alkali metal salt.

2. A compound according to claim 1 which is 5-oxo-1,3-diphenyl-2-pyrazoline-4-carboxanilide or its alkali metal salts.

3. A compound according to claim 1 which is 1- methyl-5-oxo-3-phenyl-2-pyrazoline-4-carboxanilide or its alkali metal salts.
4. A process for the preparation of the compound according to claim 1 which comprises reacting a compound of the formula:
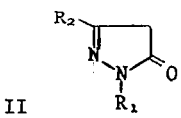
II
with sodium hydride under cooling in an inert solvent and reacting the resulting anion with
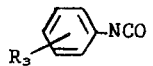
at an ambient temperature.
* * * * *